Patented June 24, 1930

1,766,064

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.    Application filed January 21, 1929. Serial No. 334,113.

This invention relates to the treatment of emulsions of mineral oil and water, such as petroleum emulsions, for the purpose of separating the oil from the water.

Petroleum emulsions are of the water-in-oil type and comprise fine droplets of naturally occurring waters or brines, dispersed in a more or less permanent state throughout the oil which constitutes the continuous phase of the emulsion. They are obtained from producing wells and from the bottoms of oil storage tanks and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment.

The treating agent employed in our process consists of a sulfonic petroleum condensation body derived by the action of a condensing agent and a sulfonating agent on a petroleum body of the kind hereinafter described and an aldehyde having fewer than fourteen carbon atoms. In manufacturing or producing said treating agent, we do not contemplate using all kinds of petroleum bodies. On the contrary we use only those petroleum bodies that are capable of uniting with sulfuric acid to give chemical compounds such as acid sulfates or sulfonic acids. We will define our treating agent or demulsifying agent more in detail by stating that it is a sulfonic petroleum condensation product derived from a petroleum body, characterized by being chemically reactive toward sulfuric acid, and an aldehyde having fewer than fourteen carbons. As a petroleum body, we can employ any raw or purified oil which is capable of sulfonation. Likewise, we can employ any material which is already a sulfonic acid or a petroleum acid sulfate. A suitable material is a petroleum sulfonic acid such as is obtained by the action of sulfuric acid or oleum on crude petroleum or its fractions, or on material obtained by pyrolytic action such as material obtained from cracking stills. Another suitable material is the petroleum body obtained by extraction of raw petroleum or other fractions with liquid sulfur dioxide. A desirable raw material may be obtained by partial oxidation of selected petroleum bodies. A carboxylic material of the designated specification is also satisfactory. Another suitable material is residual oil obtained from cracking stills, which is in essence a mixture of high boiling cyclic bodies similar to aromatic bodies. Briefly then, the petroleum body employed may be a crude oil or a fraction thereof, or a material derived from a cracking process, and is adaptable to our purpose provided it is a sulfonic body or capable of entering into reaction with sulfuric acid to give a sulfonic acid or acid sulfate.

The aldehyde employed in the manufacture or production of our treating agent may be an aliphatic aldehyde such as formaldehyde, paraformaldehyde, metaformaldehyde, or acetaldehyde. Likewise, aromatic aldehydes may be employed, such as benzaldehyde. Modified aldehydes may also be employed, such as nitro derivatives, or hydroxy derivatives, including nitro-benzaldehyde, aminobenzaldehyde, hydroxybenzaldehyde, or other substances having similar properties.

The general method used to produce the treating agent is to mix a selected petroleum body and an aldehyde body in predetermined ratios such as molecular proportions, and subject the mixture to the action of a condensing agent and sulfonating agent such as sulfuric acid, oleum, or chloro-sulfonic acid, under carefully controlled conditions. Obviously, if the petroleum body is a petroleum sulfonic acid it is only necessary to obtain condensation in so far that the sulfonic radical is already present. It is possible to introduce two or more aldehyde residues into a petroleum body. The aldehydes employed may be the same or they may be different; for instance, one may be an aliphatic aldehyde and the other may be an aromatic aldehyde. The reaction is generally produced in the presence of an excess of sulfuric acid at an elevated temperature. Usually, a large excess of sulfuric acid is preferable, and sometimes oleum or chloro-sulfonic acid must be employed. Sometimes, the reaction is accelerated by the presence of a phosphorus body such as phosphoric acid, phosphorus pentoxide, oxychloride, or such materials as aluminum chloride, zinc chloride, or iron powder. Obviously in a reaction of the kind described, more than one sulfonic group can be introduced into the petroleum body. Furthermore, in addition to aldehyde residues, alcohol residues or ketone residues or fatty residues may also be introduced into the petroleum body.

The procedure that we prefer to use in producing the treating agent or demulsifying agent contemplated by our process is as follows: One mole of formaldehyde is mixed with one mole of a petroleum sulfonic acid, and agitated vigorously. Sulfuric acid is added slowly without permitting a temperature rise until all danger of an explosive reaction is passed. The temperature is then allowed to rise moderately and excess acid is added until condensation is complete. At times, it may be necessary to add a small amount of oleum or chloro-sulfonic acid to complete the final condensation. Sometimes a suitable catalyst such as a phosphorus compound is added to promote the reaction. When the reaction is complete, the mass is carefully diluted with water until an upper layer separates. The upper layer is drawn off and neutralized with any suitable base, such as caustic soda, caustic potash, or ammonia. We prefer to use ammonia.

Our broad idea contemplates the use of a treating agent having the general characteristics pointed out, produced in various ways. The treating agent that we prefer to employ however, is one that produces an insoluble precipitate with soluble alkaline earth salts. The presence or absence of such precipitate probably depends in part on the number of sulfonic acid groups introduced into the petroleum body. Therefore, it is our preference that the reaction be carried on so that the product of the reaction will show insolubility with alkaline earth salts by a suitable test such as the following: A 1% solution of the reagent is mixed with a 1% solution of magnesium sulfate and heated for 10 to 30 minutes in a water bath just below the boiling point of water, if required. In the test with either the calcium salt or the magnesium salt, a precipitate should be obtained which remains after the mixture is diluted with two times its volume of distilled water.

A material or substance of the kind above described can be employed as an acid mass to treat a petroleum emulsion but this is not desirable, due to its corrosive effect. There is no objection to an excess of alkali if desired. Such material can also be converted into an ester by esterification in the usual manner to produce an aromatic or aliphatic ester such as the ethyl ester. Some of the esters so produced may be oil-soluble, such as the hexyl ester. The treating agent when it is ready for use may be acidic in nature, and the complex substituted aromatic sulfonic group may be united with an acid hydrogen ion, as is the case when the acid itself is employed. When said acidic material is neutralized, the hydrogen ion is replaced by a suitable metallic ion equivalent such as a true metallic ion or an ammonium radical. In the event that the material is esterified, the hydrogen ion is replaced by an organic radical such as an ethyl radical. We will refer to the hydrogen ion or its metallic substitute or its organic substitute as the hydrogen ion equivalent.

The form, state or condition of the treating agent at the time it is mixed with or applied to the petroleum emulsion to be treated, and may be varied to suit existing conditions. It can be used in substantially anhydrous state or in solution of any convenient strength. A concentrated solution can be emulsified into oil by agency of any suitable oil-soluble emulsifier such as calcium oleate. The treating agent can be formed entirely from a material of the kind previously described or it can be formed from such a material in combination with other well-known treating agents for petroleum emulsions of the water-in-oil type such as water softeners, modified fatty bodies or their soaps, petroleum sulfonic acids or their soaps, or other substances having similar properties.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an old storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having thus described our invention, what we claim as new and desire to secure by Letters Patent of the United States is:

1. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and an aldehyde.

2. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and an aldehyde.

3. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and an aldehyde.

4. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and an aldehyde.

5. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and an aliphatic aldehyde.

6. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and an aliphatic aldehyde.

7. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and an aliphatic aldehyde.

8. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and an aliphatic aldehyde.

9. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and an aliphatic aldehyde, and furthermore characterized by producing a precipitate with an alkaline earth salt.

10. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and an aliphatic aldehyde, and furthermore characterized by producing a precipitate with an alkaline earth salt.

11. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid, and an aliphatic aldehyde, and furthermore characterized by producing a precipitate with an alkaline earth salt.

12. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and an aliphatic aldehyde, and furthermore characterized by producing a precipitate with an alkaline earth salt.

13. A process for breaking a petroleum emulsion of the water-in-oil type, which consists in subjecting the emulsion to the action of a demulsifying agent containing a petroleum sulfonic body derived from the condensation of a petroleum body, characterized by being capable of reaction with sulfuric acid, and formaldehyde, and furthermore characterized by producing a precipitate with an alkaline earth salt.

14. A process for breaking a petroleum emulsion of the water-in-oil type, which consists in subjecting the emulsion to the action of a water-soluble demulsifying agent containing a petroleum sulfonic body derived from the condensation of a petroleum body, characterized by being capable of reaction with sulfuric acid, and formaldehyde, and furthermore characterized by producing a precipitate with an alkaline earth salt.

15. A process for breaking a petroleum emulsion of the water-in-oil type, which consists in subjecting the emulsion to the action of a water-soluble demulsifying agent containing a water-soluble salt of a petroleum sulfonic body derived from the condensation of a petroleum body, characterized by being capable of reaction with sulfuric acid and formaldehyde, and furthermore characterized by producing a precipitate with an alkaline earth salt.

16. A process for breaking a petroleum emulsion of the water-in-oil type, which consists in subjecting the emulsion to the action of a water-soluble demulsifying agent containing an ammonium salt of a petroleum sulfonic body derived from the condensation of a petroleum body, characterized by being capable of reaction with sulfuric acid, and formaldehyde, and furthermore characterized by producing a precipitate with an alkaline earth salt.

MELVIN DE GROOTE.
LOUIS T. MONSON.